United States Patent Office 3,330,788
Patented July 11, 1967

3,330,788
POLYVINYL CHLORIDE BLENDED WITH MIXTURE OF LIGNIN-BUTADIENE STYRENE COPOLYMER
Charles W. Montgomery, Baton Rouge, La., assignor to Ethyl Corporation, New York, N.Y., a corporation of Virginia
No Drawing. Filed Mar. 30, 1962, Ser. No. 183,741
2 Claims. (Cl. 260—17.5)

This invention relates to the art of producing polyvinyl chloride compositions, particularly high impact rigid polyvinyl chloride compositions.

Most of the polyvinyl chloride compositions of present commerce are possessed of very low impact strength. Thus, even the normal rigid polyvinyl chloride of commerce which is a hard, chemically resistant, thermoplastic material has nevertheless relatively poor impact resistance. Such material is grossly lacking in its ability to withstand the normal blows and impacts which it receives even in the most normal usage. Numerous attempts have been made to alloy polyvinyl chloride with other materials to improve its impact strength. Such alloying of the polyvinyl chloride even with known tough plastics, however, generally does not materially improve the normal impact strength of rigid polyvinyl chloride. Moreover, invariably, even if materials are found which will somewhat improve the impact strength of polyvinyl chloride these materials generally provide adverse side effects which degrade other polymeric properties. A polymeric property of polyvinyl chloride which is most often detrimentally affected by such additives is heat distortion temperature.

It is an object of the present invention therefore to obviate the foregoing difficulties and to provide the art with rigid polyvinyl chloride fused compositions having a desirable combination of polymeric properties, such as chemical resistance, high heat distortion temperature, and which are quite tough and have high impact strength. In particular, it is an object to provide these desirable polymeric materials without significantly impairing the other normally desirable polymeric properties. More specifically, it is an object to provide polyvinyl chloride plastic polymer compositions which are rigid, possess good impact strength, but yet offer high resistance to distortion by heat.

These and other objects are achieved pursuant to the present invention which provides new and novel polyvinyl chloride compositions comprising polyvinyl chloride within which is blended from about 1 to about 20 parts, per 100 parts of polyvinyl chloride, of a mixture of lignin and a butadiene-styrene copolymer.

Such polyvinyl chloride compositions have been found to possess superior impact strength, and yet other polymeric properties of the original polyvinyl chloride are not significantly affected by the fusing together of the polyvinyl chloride, the lignin and the butadiene-styrene copolymer. In particular, the heat distortion point of the polyvinyl chloride is essentially unaffected. This is quite surprising and indeed remarkable for generally the mixing of polyvinyl chloride even with small quantities of materials known to be high impact resistant does not form a high impact resistant product. Moreover, when alloying polyvinyl chloride with impact resistant materials there is ofttimes produced a product very inferior to the original polyvinyl chloride particularly as regards the heat distortion point. Pursuant to the present invention, however, a high impact type rigid polyvinyl chloride is produced by the fusing together of from about 80 to about 99 parts of polyvinyl chloride with about 1 to about 20 parts of a mixture of lignin and a butadiene-styrene copolymer.

The lignin copolymer mixture preferably consists essentially of from about 60 to about 80 parts of the lignin per 100 parts of the copolymer, and the copolymer preferably consists essentially of from about 50 to about 80 weight percent butadiene and from about 20 to about 50 weight percent styrene.

A particularly preferred composition because of its outstanding high impact strength and its high heat distortion temperature is one consisting essentially of a medium molecular weight polyvinyl chloride—viz., from about 30,000 to about 60,000—and from about 5 to about 15 parts, per 100 parts of polyvinyl chloride, of a mixture of lignin and butadiene-styrene copolymer, the mixture being about 70 parts of lignin, per 100 parts of copolymer, and the copolymer being about 70 parts butadiene and 30 parts styrene.

To illustrate the benefits of the invention, a number of rigid polyvinyl chloride plastic compositions were prepared for evaluation as high impact plastics. These plastic compositions consisted of a basic recipe of polyvinyl chloride, stabilizer, and lubricant. The basic recipe was mixed with various quantities of co-precipitates of lignin and butadiene-styrene copolymer. The basic recipe contained the following ingredients in the following proportions:

| | Parts |
|---|---|
| Polyvinyl chloride—medium molecular weight polymer (44,000–46,000) | 100 |
| Stabilizer—dibutyl tin dilaurate | 3 |
| Lubricant—stearic acid | 1 |

To the basic recipe was added the various lignin copolymer precipitates in the proportions given in the specific examples below.

These compositions were prepared by mixing the basic polyvinyl chloride recipe and the lignin copolymer co-precipitates together in the solid form.

A heated differential rolled mill was used to mix and fuse the ingredients together. The basic polyvinyl chloride recipe was blended on the mill at a temperature ranging from 320 to 340° F., and allowed to flux thoroughly. The lignin copolymer co-precipitates were then blended into the molten polyvinyl chloride and milled for approximately 10 minutes to assure complete mixing. The finished compound was sheeted from the mill in sections approximately 1/16 inch in thickness.

The sheets from the mill were laminated to 1/4 inch thickness in a hydraulic press which was heated to between 350 to 400° F. Pieces for testing resistance to impact and resistance to distortion by heat were then cut from the 1/4 inch stock.

The two key properties, resistance to impact (Izod impact) and resistance to distortion by heat (heat distortion point), were measured from requisite test pieces of each compound. Izod impact (impact resistance of a notched piece 1/2" x 1/4" x 2 1/2") was measured as prescribed by ASTM D256–47T, "Impact Resistance of Plastic Materials." Heat distortion point (temperature at which a piece 1/2" x 1/4" x 5" sags under stress) was measured in accordance with ASTM D648–55T, "Heat Distortion Temperature of Plastics."

In Examples I through IV in the table, and in Examples V and VI immediately following, compositions were formed which consisted essentially of polyvinyl chloride to which was added in the amount shown a co-precipitate of lignin and a butadiene-styrene copolymer. The lignin, indulin, and the copolymer were contained in the plastic composition at a weight ratio of the two materials of 70 parts of indulin per 100 parts of the copolymer. The copolymer consisted of 50 weight percent styrene and 50 weight percent butadiene.

TABLE

| Ex. No. | Concentration of Lignin-Copolymer Parts per 100 Parts of Polyvinyl Chloride | Impact Strength (ft.-lb./in.) | Heat Distortion Point ° C. |
|---|---|---|---|
|     | 0  | 0.5 | 59 |
| I   | 1  | 0.7 | 59 |
| II  | 2  | 0.8 | 59 |
| III | 5  | 1.2 | 60 |
| IV  | 10 | 4.0 | 62 |

*Examples V–VI*

Use of concentrations of 15 and 20 parts of the lignin butadiene-styrene copolymer produces plastic compositions having Izod impact strengths approaching 8 ft.-lb./in. and heat distortion points approaching 66° C.

In all of the foregoing examples other polymeric properties of the original polyvinyl chloride remained substantially unimpaired though impact strength and heat distortion temperature were drastically improved.

Use of other lignin copolymer co-precipitates in the polyvinyl chloride in the weight ratios of lignin:copolymer of 60:40, 75:25 and 80:20 also produces good results. Thus, use of these indulin copolymer co-precipitates in ranges of from 1 to 20 parts, per 100 parts of polyvinyl chloride, are found to readily provide very good results. Moreover, where the copolymer contains a 60:40, 70:30 and 80:20 ratio of butadiene:styrene good results are also obtained.

It is apparent that considerable variation can be made in the present invention without departing its spirit and scope.

Many commercial types of lignin can be used in the practice of this invention. The term "lignin" includes the various forms of the substance, or mixtures of substances, from the woody tissue known as lignin. Commercial preparations of lignin are generally made by precipitating lignin from aqueous solutions, such methods being known to the art. The lignin can also be co-precipitated with various materials, for example, with butadiene-styrene copolymer. A commercially produced lignin-butadiene styrene copolymer co-precipitate is one known as Polyol S–70.

The polyvinyl chloride used in this invention and the copolymer for blending therewith can be prepared by many of well known polymerization proceses. The polyvinyl chloride used is preferably one made by an emulsion or suspension process having a molecular weight ranging from about 30,000 to about 60,000. The butadiene-styrene copolymer used can be made by many known methods, but is preferably a "cold rubber" polymerized at about 41° F.

The plastic compositions of this invention can be combined with various fillers, woodflour, plasticizers, pigments, carbon blacks, age resistors, coloring compounds, solvents and the like to produce a great variety of compositions useful to the art.

While concentrations of the lignin butadiene-styrene copolymer up to 20 parts, per 100 parts of polyvinyl chloride, give very satisfactory results, greater concentrations can also be used quite satisfactorily.

Having described the invention, what is claimed is:

1. The composition of matter consisting essentially of polyvinyl chloride containing from about 1 to about 20 parts, per 100 parts of polyvinyl chloride, of a mixture of lignin and a butadiene-styrene copolymer, the mixture consisting essentially of from about 60 to about 80 parts of the lignin per 100 parts of copolymer, and the copolymer consisting essentially of from about 50 to about 80 weight percent butadiene and from about 20 to about 50 weight percent styrene.

2. A rigid high impact polyvinyl chloride plastic composition consisting essentially of polyvinyl chloride having a molecular weight of from about 30,000 to about 60,000 and from about 5 to about 15 parts, per 100 parts of polyvinyl chloride, of a mixture of lignin and a butadiene-styrene copolymer, the mixture being about 70 parts of lignin per 100 parts of copolymer, and the copolymer being about 70 parts butadiene and 30 parts styrene.

References Cited

UNITED STATES PATENTS

| | | | |
|---|---|---|---|
| 2,713,040 | 7/1955  | Brass et al.     | 260—890 |
| 2,970,979 | 2/1961  | Meder et al.     | 260—890 |
| 3,005,796 | 10/1961 | Dreisbach et al. | 260—890 |

OTHER REFERENCES

Murray et al.: India Rubber World, August 1948, pages 667–9. (Copy in Sci. Lib.)

WILLIAM H. SHORT, *Primary Examiner.*

LEON J. BERCOVITZ, *Examiner.*

J. ZIEGLER, J. NORRIS, *Assistant Examiners.*